United States Patent
Kadobayashi (10) Patent No.: US 11,427,295 B2
(45) Date of Patent: Aug. 30, 2022

(54) MARINE PROPULSION SYSTEM AND CONTROL METHOD

(71) Applicant: YAMAHA HATSUDOKI KABUSHIKI KAISHA, Iwata (JP)

(72) Inventor: Yoshiyuki Kadobayashi, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 17 days.

(21) Appl. No.: 17/155,199

(22) Filed: Jan. 22, 2021

(65) Prior Publication Data
US 2021/0253214 A1    Aug. 19, 2021

(30) Foreign Application Priority Data
Feb. 19, 2020 (JP) .............................. JP2020-026310

(51) Int. Cl.
*B63H 21/21* (2006.01)
*B60L 50/60* (2019.01)
(Continued)

(52) U.S. Cl.
CPC .............. *B63H 21/21* (2013.01); *B60L 50/66* (2019.02); *B63H 1/14* (2013.01); *B63H 20/14* (2013.01); *B63H 21/14* (2013.01); *B63H 21/17* (2013.01); *B63H 21/20* (2013.01); *F02B 61/045* (2013.01); *F02B 63/042* (2013.01);
(Continued)

(58) Field of Classification Search
CPC ........ B63H 21/21; B63H 21/14; B63H 21/17; B63H 21/20; B63H 1/14; B63H 2021/202; B63H 2021/216; B60L 50/66; B60L 2200/32; F02B 61/045; F02B 63/042
See application file for complete search history.

(56) References Cited

U.S. PATENT DOCUMENTS 7,556,547 B2    7/2009 Kaji
8,454,402 B1 *  6/2013 Arbuckle ............... B63H 21/21
                                                  440/86
(Continued)

FOREIGN PATENT DOCUMENTS

EP    3 590 822 A1    1/2020
JP    2013-147186 A   8/2013
WO    2018/159208 A1  9/2018

OTHER PUBLICATIONS

Official Communication issued in corresponding European Patent Application No. 21156894.4, dated Jul. 2, 2021.

*Primary Examiner* — Stephen P Avila
(74) *Attorney, Agent, or Firm* — Keating and Bennett, LLP (57) ABSTRACT

A marine propulsion system includes a marine propulsion device, a battery, and a controller. The marine propulsion device includes a propeller shaft, an engine, and an electric motor. The marine propulsion device transmits mechanical power from at least one of the engine and the electric motor to the propeller shaft. The battery supplies electric power to the electric motor. The controller controls the marine propulsion device such that the marine propulsion device is switchable among drive modes including a first drive mode and a second drive mode. In the first drive mode, mechanical power is transmitted from only the engine to the propeller shaft. In the second drive mode, mechanical power is transmitted from only the electric motor to the propeller shaft when the engine is in an idling state.

18 Claims, 7 Drawing Sheets

(51) Int. Cl.
    *B63H 1/14*     (2006.01)
    *B63H 20/14*     (2006.01)
    *B63H 21/14*     (2006.01)
    *B63H 21/17*     (2006.01)
    *B63H 21/20*     (2006.01)
    *F02B 61/04*     (2006.01)
    *F02B 63/04*     (2006.01)

(52) U.S. Cl.
    CPC ..... *B60L 2200/32* (2013.01); *B63H 2021/202* (2013.01); *B63H 2021/216* (2013.01)

(56) References Cited

U.S. PATENT DOCUMENTS

2009/0215329 A1*   8/2009   Suzuki ................... B63H 23/08
                                                                                         440/1
2012/0083173 A1    4/2012   McMillan \* cited by examiner

MARINE PROPULSION SYSTEM AND CONTROL METHOD

CROSS REFERENCE TO RELATED APPLICATIONS

This application claims the benefit of priority to Japanese Patent Application No. 2020-026310 filed on Feb. 19, 2020. The entire contents of this application are hereby incorporated herein by reference.

BACKGROUND OF THE INVENTION

1. Field of the Invention

The present invention relates to a marine propulsion system and a control method thereof.

2. Description of the Related Art

There has been conventionally known a type of marine propulsion system including both an engine and an electric motor as mechanical power sources for rotating a propeller shaft of a watercraft (Japan Laid-open Patent Application Publication No. 2013-147186). The marine propulsion system is configured to rotate the propeller shaft only by a drive force of the electric motor in an extremely low speed range and is also configured to rotate the propeller shaft by a drive force of the engine when a speed exceeds a predetermined speed. The electric motor is supplied with electric power through a battery from a power generator that generates the electric power when driven by the engine.

SUMMARY OF THE INVENTION

Preferred embodiments of the present invention provide marine propulsion systems each including both an engine and an electric motor as mechanical power sources to rotate a propeller shaft.

A marine propulsion system according to a first preferred embodiment of the present invention includes a marine propulsion device, a battery, and a controller. The marine propulsion device includes a propeller shaft, an engine, and an electric motor. The marine propulsion device transmits a mechanical power from at least one of the engine and the electric motor to the propeller shaft. The battery supplies an electric power to the electric motor. The controller is configured or programmed to control the marine propulsion device such that the marine propulsion device is switchable among a plurality of drive modes including a first drive mode in which the mechanical power is transmitted from only the engine to the propeller shaft and a second drive mode in which the mechanical power is transmitted from only the electric motor to the propeller shaft when the engine is in an idling state.

A method according to a second preferred embodiment of the present invention relates to a method of controlling a marine propulsion system including a marine propulsion device and a battery. The marine propulsion device includes a propeller shaft, an engine, and an electric motor. The marine propulsion device transmits a mechanical power from at least one of the engine and the electric motor to the propeller shaft. The battery supplies an electric power to the electric motor. The method includes controlling the marine propulsion device such that the marine propulsion device is switchable among a plurality of drive modes including a first drive mode in which the mechanical power is transmitted from only the engine to the propeller shaft, and a second drive mode in which the mechanical power is transmitted from only the electric motor to the propeller shaft when the engine is in an idling state.

Overall, in the marine propulsion systems and the control methods thereof according to preferred embodiments of the present invention, the engine is controlled to be in the idling state in the second drive mode to bring about the state in which the drive force is transmitted from only the electric motor to the propeller shaft. Thus, it is possible to enhance the merchantability of the marine propulsion system.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
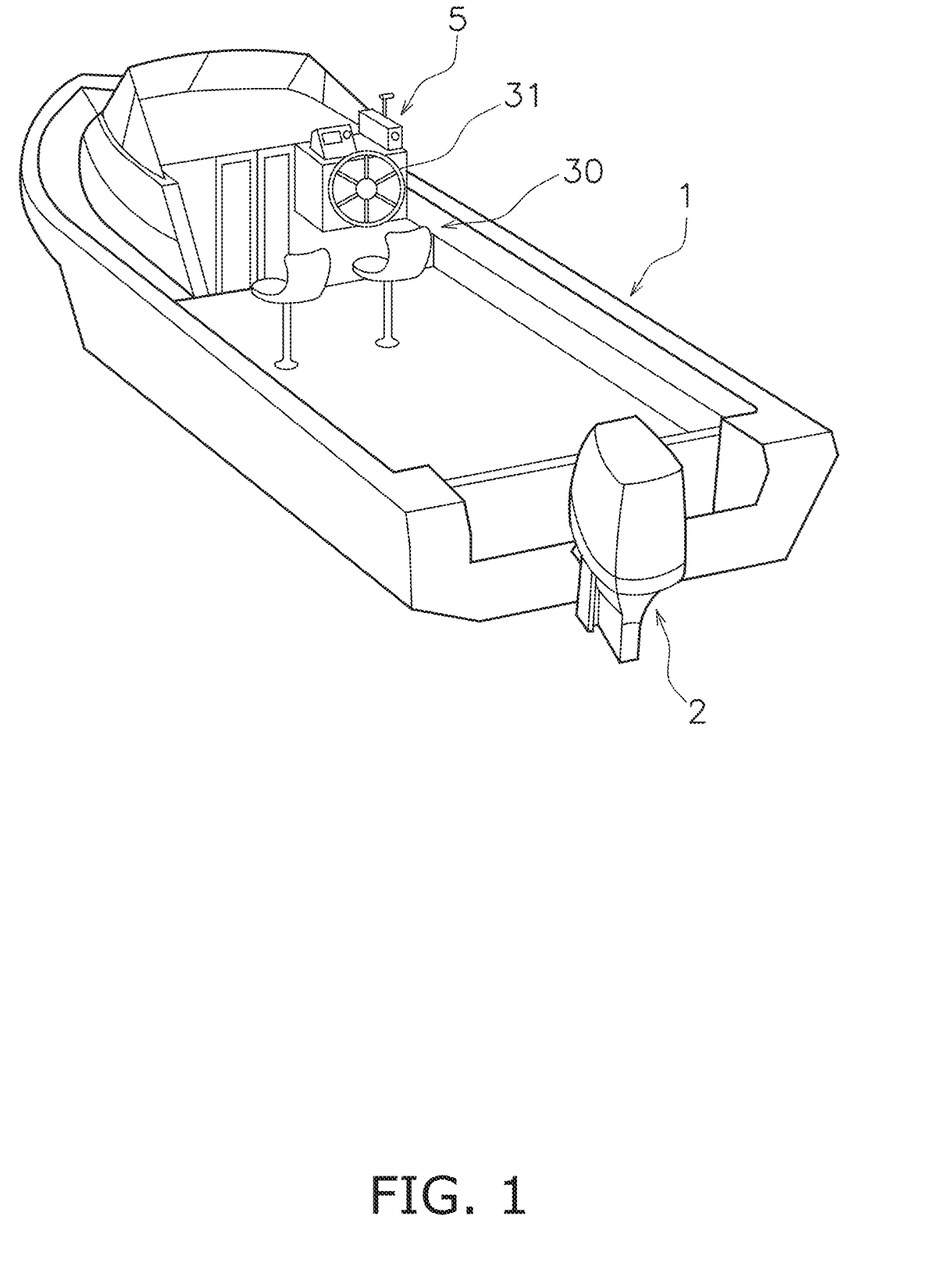
FIG. 1 is a perspective view of a watercraft including a marine propulsion system.
Figure 2:
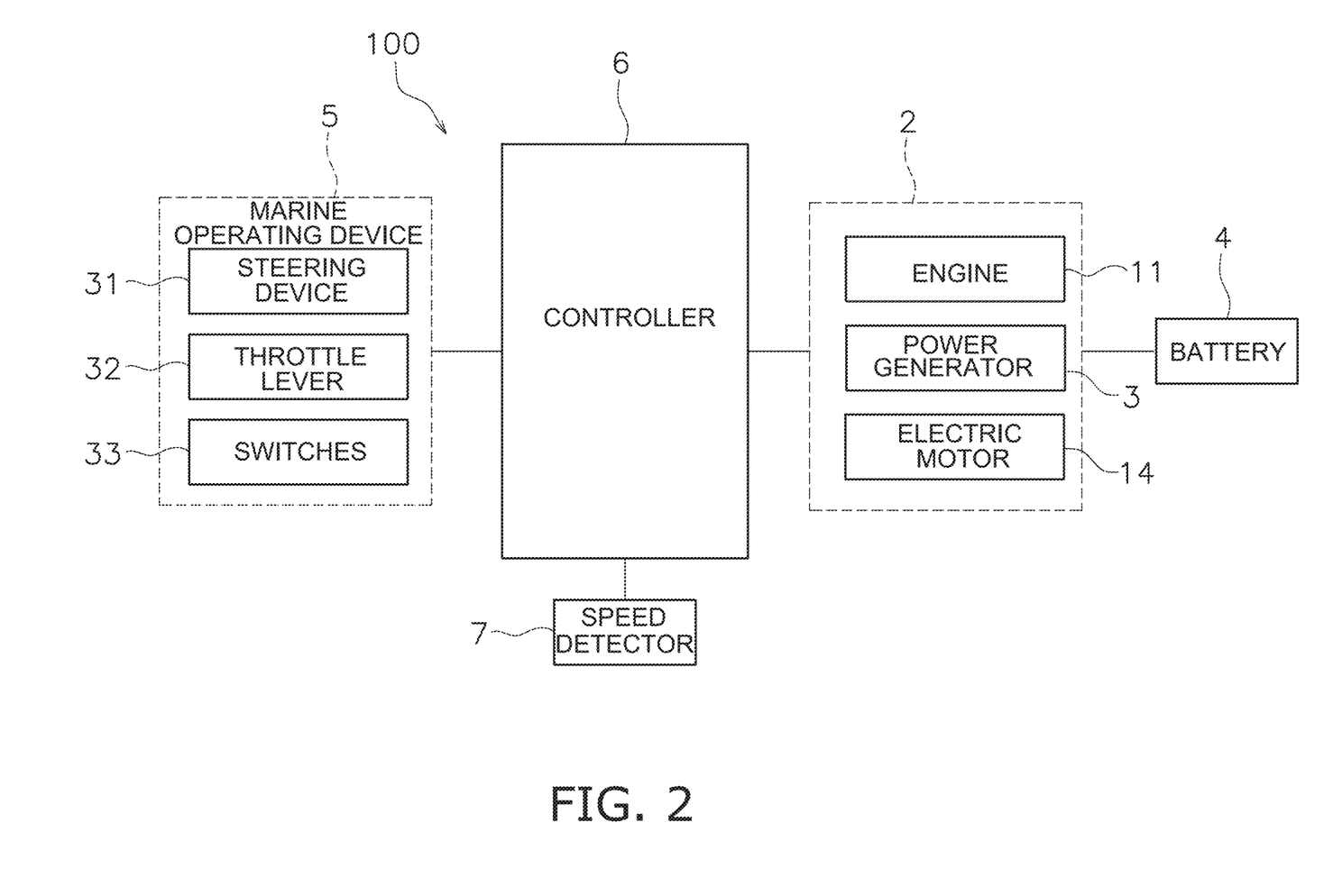
FIG. 2 is a block diagram showing a configuration of the marine propulsion system.

Preferred embodiments will be hereinafter explained with reference to drawings. FIG. 1 is a perspective view of a watercraft 1 including a marine propulsion system 100 according to a first preferred embodiment of the present invention. FIG. 2 is a block diagram showing a configuration of the marine propulsion system 100. The marine propulsion system 100 includes an outboard motor 2, a power generator 3, a battery 4, a marine operating device 5, and a controller 6. The outboard motor 2 is an exemplary marine propulsion device.

Figure 3:
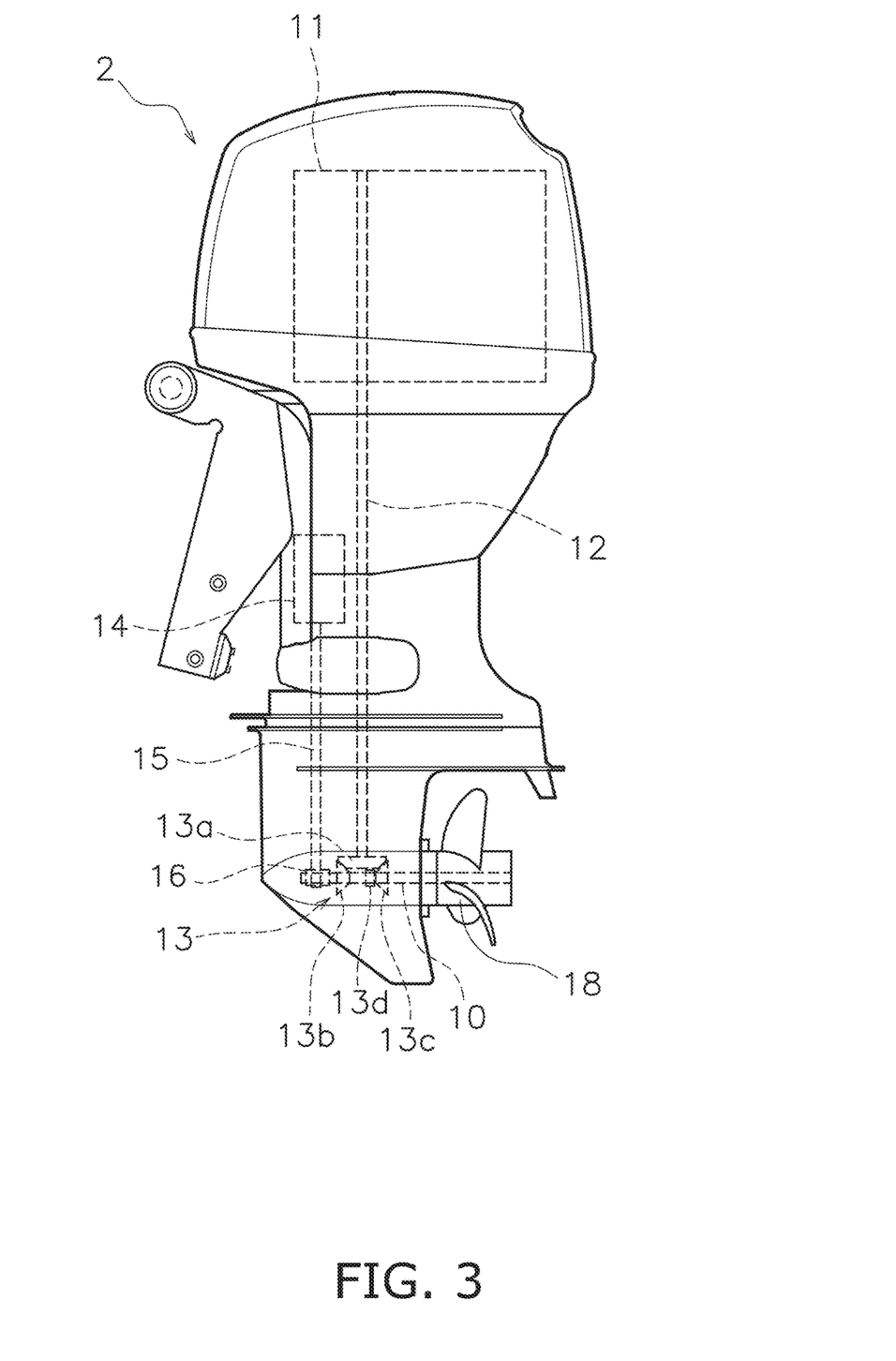
FIG. 3 is a side view of an outboard motor.

The outboard motor 2 generates a thrust to propel the watercraft 1. The outboard motor 2 is attached to the middle of the stern of the watercraft 1. FIG. 3 is a side view of the outboard motor 2. As shown in FIGS. 2 and 3, the outboard motor 2 includes a propeller shaft 10, an engine 11, a drive shaft 12, an engine clutch 13, an electric motor 14, a motor shaft 15, and a motor clutch 16.

In the outboard motor 2, mechanical power is transmitted from at least one of the engine 11 and the electric motor 14 to the propeller shaft 10. In the outboard motor 2 according to the present preferred embodiment, mechanical power is transmitted from either one of the engine 11 and the electric motor 14 to the propeller shaft 10.

The propeller shaft 10 extends in the back-and-forth direction of the watercraft 1. A propeller 18 that rotates integrally with the propeller shaft 10 is attached to the propeller shaft 10.

The drive shaft 12 extends in the vertical direction. The drive shaft 12 is rotated when driven by the engine 11. The engine clutch 13 connects or disconnects the drive shaft 12 and the propeller shaft 10 to or from each other. Additionally, the engine clutch 13 switches a rotational direction of the propeller shaft 10.

The engine clutch 13 includes a drive gear 13a, a forward moving gear 13b, a rearward moving gear 13c, and a dog clutch 13d. The drive gear 13a is rotated integrally with the drive shaft 12. The forward moving gear 13b and the rearward moving gear 13c are meshed with the drive gear 13a. Rotation of the drive shaft 12 is transmitted to the forward moving gear 13b and the rearward moving gear 13c through the drive gear 13a. The dog clutch 13d is movable to a forward moving position, a neutral position, and a rearward moving position.

When the dog clutch 13d is in the forward moving position, the forward moving gear 13b is connected to the propeller shaft 10 such that rotation of the drive shaft 12 is transmitted to the propeller shaft 10 through the forward moving gear 13b. When the dog clutch 13d is in the neutral position, the propeller shaft 10 is disconnected from the forward moving gear 13b and the rearward moving gear 13c such that rotation of the drive shaft 12 is not transmitted to the propeller shaft 10. When the dog clutch 13d is in the rearward moving position, the rearward moving gear 13c is connected to the propeller shaft 10 such that rotation of the drive shaft 12 is transmitted to the propeller shaft 10 through the rearward moving gear 13c.

The electric motor 14 is driven by electric power supplied thereto from the battery 4. The motor shaft 15 extends parallel or substantially parallel to the drive shaft 12. The motor shaft 15 is rotated when driven by the electric motor 14. The motor clutch 16 connects or disconnects the motor shaft 15 and the propeller shaft 10 to or from each other. The motor clutch 16 is movable to a connecting position or a disconnecting position. When the motor clutch 16 is in the connecting position, rotation of the motor shaft 15 is transmitted to the propeller shaft 10 through a motor gear (not shown in the drawings). When the motor clutch 16 is in the disconnecting position, the propeller shaft 10 is disconnected from the motor gear such that rotation of the motor shaft 15 is not transmitted to the propeller shaft 10.

The power generator 3 generates electric power when driven by the engine 11. The power generator 3 supplies the electric power generated therein to the battery 4. The power generator 3 is located inside the outboard motor 2 and is connected to the engine 11. The power generator 3 includes a rotor and a stator. The power generator 3 generates electric power when the rotor, connected to the drive shaft 12, is rotated with respect to the stator. It should be noted that the power generator 3 may supply the electric power generated therein not only to the battery 4 but also to the electric motor 14.

The battery 4 is connected to the outboard motor 2. The battery 4 stores the electric power generated in the power generator 3 and supplies the electric power stored therein to the electric motor 14. It should be noted that the battery 4 and the controller 6 may be connected to supply the electric power stored in the battery 4 to the controller 6.

The marine operating device 5 is located in a cockpit 30 on the watercraft 1. As shown in FIG. 2, the marine operating device 5 includes a steering device 31, a throttle lever 32, and a plurality of switches 33. The steering device 31 turns a direction of the watercraft 1. The throttle lever 32 regulates the thrust generated by the outboard motor 2 and switches the direction of the thrust between forward and rearward directions. The plurality of switches 33 include a switch to start the engine 11, a switch to set a vessel speed, and a switch to switch the outboard motor 2 among a plurality of drive modes. The marine operating device 5 is connected to the controller 6 via wired or wireless communication. When the marine operating device 5 is operated, an operating signal is outputted from the marine operating device 5 to the controller 6.

The controller 6 controls the outboard motor 2. The controller 6 is configured or programmed to control the outboard motor 2 in accordance with the operating signal outputted thereto from the marine operating device 5. The controller 6 includes a processor such as a CPU and memories such as a RAM and a ROM. The controller 6 stores programs and data to control the outboard motor 2. The controller 6 may be located inside the outboard motor 2, or alternatively, may be located outside the outboard motor 2.

The controller 6 controls the outboard motor 2 such that the outboard motor 2 is switched among the plurality of drive modes. The controller 6 moves the engine clutch 13 and the motor clutch 16 through an actuator such that the outboard motor 2 is switched among the drive modes. Additionally, the controller 6 controls the driving and output of the engine 11 and/or those of the electric motor 14 in accordance with the operating position of the throttle lever 32 and the operating statuses of the switches 33.

Figure 4:
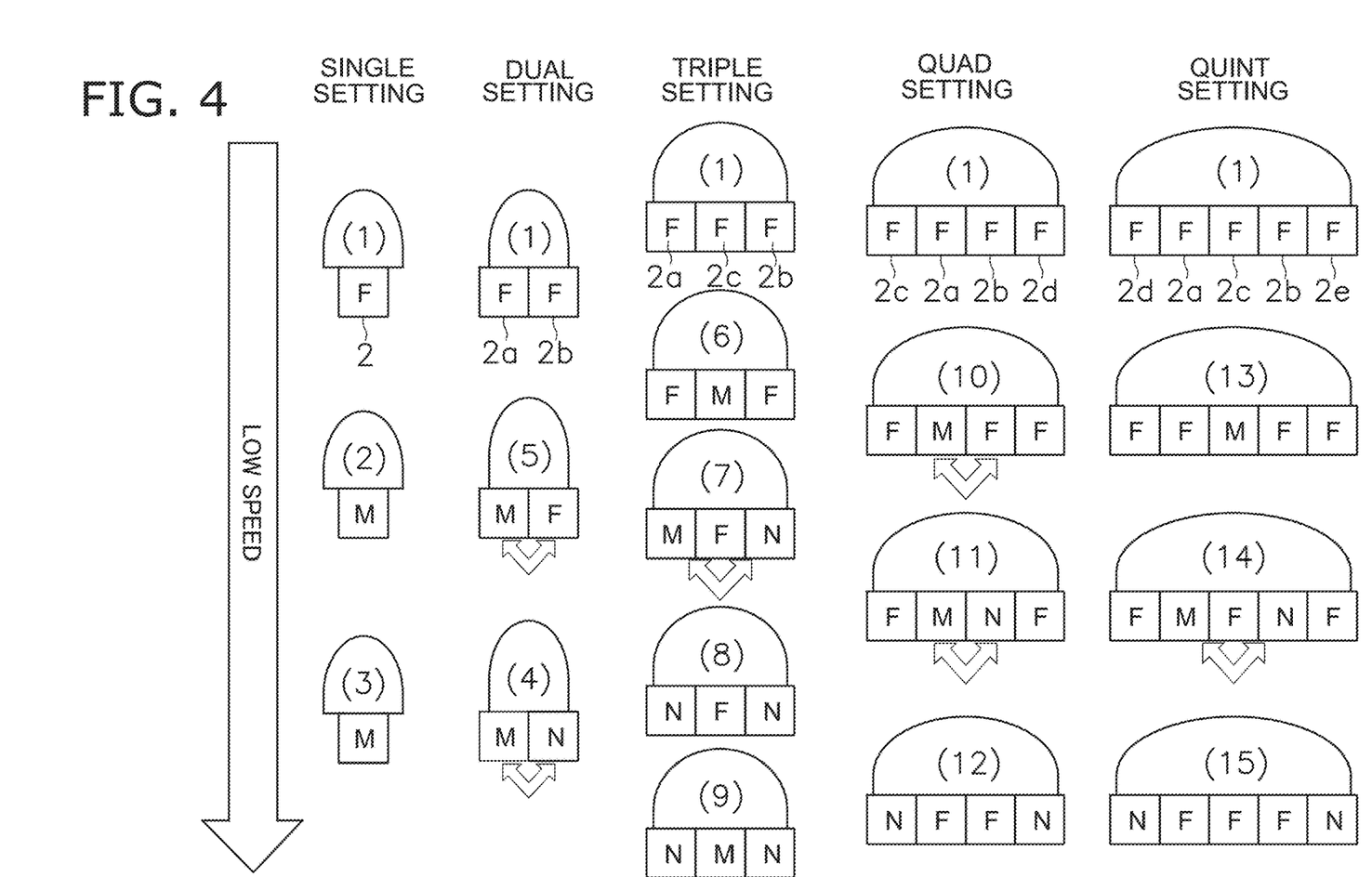
FIG. 4 is a diagram exemplifying patterns to switch the outboard motor among drive modes.

FIG. 4 is a diagram exemplifying patterns to switch the outboard motor 2 among the plurality of drive modes. As shown by (1) and (2) in FIG. 4, the plurality of drive modes at least include a first drive mode (F) and a second drive mode (M). The first drive mode is a state in which the mechanical power is transmitted from only the engine 11 to the propeller shaft 10. The second drive mode is a state in which the mechanical power is transmitted from only the electric motor 14 to the propeller shaft 10 while the engine 11 is in an idling state. The plurality of drive modes may further include a third drive mode in which the mechanical power is transmitted from only the electric motor 14 to the propeller shaft 10 while the engine 11 is in a stopped state. Alternatively or furthermore, the plurality of drive modes may include a drive mode in which the mechanical power is transmitted from both the engine 11 and the electric motor 14 to the propeller shaft 10. It should be noted that FIG. 4 also exemplifies patterns to switch a plurality of outboard motors 2 among a plurality of drive modes. The patterns will be described in detail.

The first drive mode is used to propel the watercraft 1 in a high speed range. In the first drive mode, the engine 11 is a mechanical power source. In the first drive mode, the electric motor 14 is not driven. In the first drive mode, the controller 6 controls the output of the engine 11 in accordance with the operating position of the throttle lever 32.

The second and third drive modes are used to propel the watercraft 1 in an extremely low speed range. In the second drive mode, the electric motor 14 is a mechanical power source. In the second drive mode, the controller 6 controls the engine 11 in the idling state. From a converse perspective, in the second drive mode, the engine 11 is controlled to be in the idling state by the controller 6. Additionally, in the second drive mode, electric power is generated by the power generator 3. Thus, a shortage of electric power supply to the electric motor 14 is reduced or prevented. Moreover, the watercraft 1 is able to cruise in the extremely low speed range for a long period of time.

The rotational speed of the electric motor 14 in the second drive mode is lower than that of the engine 11 in the idling state. The controller 6 may limit the output of the electric motor 14 to a constant value except for when the mechanical power source is switched from the electric motor 14 to the engine 11. Alternatively, the controller 6 may control the output of the electric motor 14 to be changed in accordance with the operating position of the throttle lever 32 and the operating statuses of the switches 33.

The third drive mode is different from the second drive mode only in that the engine 11 is controlled to be in the stopped state by the controller 6. The third drive mode is effective for a quiet-required situation such as docking.

The controller 6 may switch the plurality of drive modes according to the operating amount of the throttle lever 32, the vessel speed, or combination thereof. Alternatively, the controller 6 may switch the plurality of drive modes according to the operating the switches 33.

For example, when the vessel speed is less than or equal to a predetermined speed by operating the throttle lever 32 or the switches 33, the controller 6 may drive the outboard motor 2 in the second drive mode. Additionally, when the vessel speed is greater than the predetermined speed by operating the throttle lever 32 or the switches 33, the controller 6 may drive the outboard motor 2 in the first drive mode.

As shown in FIG. 2, the marine propulsion system 100 may further include a speed detector 7 to detect the vessel speed. In this configuration, when the vessel speed detected by the speed detector 7 becomes less than or equal to the predetermined speed while the outboard motor 2 is driven in the first drive mode, the controller 6 may switch the outboard motor 2 from the first drive mode to the second drive mode.

Figure 5:
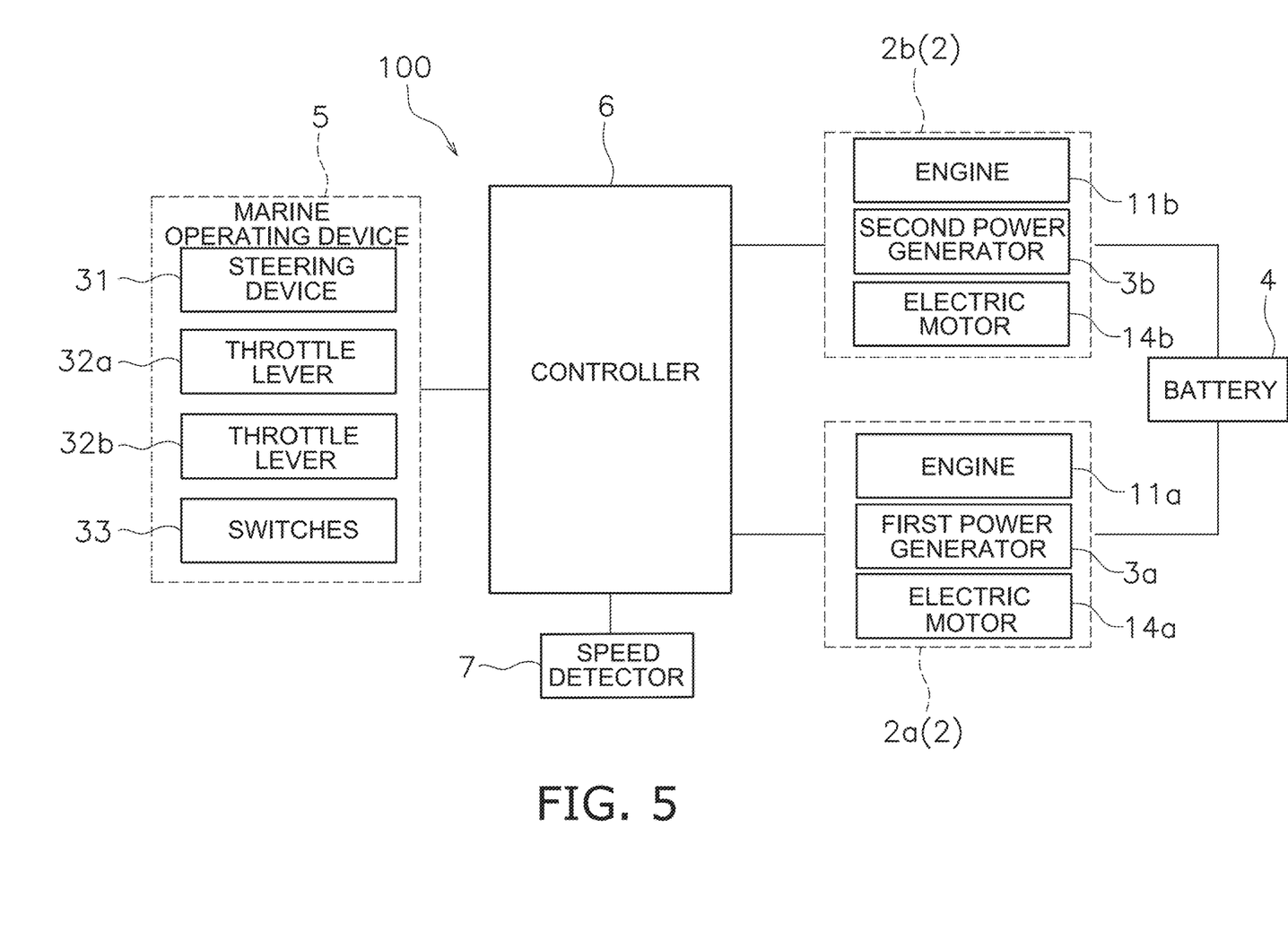
FIG. 5 is a block diagram showing a configuration of the marine propulsion system according to a second preferred embodiment of the present invention.

FIG. 5 is a block diagram showing a configuration of the marine propulsion system 100 according to a second preferred embodiment of the present invention. The following explanation will be provided for elements different from corresponding ones in the first preferred embodiment; explanation will be omitted for elements similar to corresponding ones in the first preferred embodiment. It should be noted that reference signs assigned to elements in FIG. 5 are the same as those assigned to corresponding ones in the first preferred embodiment.

In the second preferred embodiment, two outboard motors, including a first outboard motor 2a and a second outboard motor 2b, are provided as the outboard motors 2. The first outboard motor 2a is attached to the port of the stern of the watercraft 1. The first outboard motor 2a is an exemplary first marine propulsion device. The second outboard motor 2b is attached to the starboard of the stern of the watercraft 1 and is aligned with the first outboard motor 2a. The second outboard motor 2b is an exemplary second marine propulsion device.

Each of the first and second outboard motors 2a and 2b has a similar configuration to the outboard motor 2. The first outboard motor 2a, when described in detail, includes an engine 11a and an electric motor 14a. The second outboard motor 2b includes an engine 11b and an electric motor 14b. Each engine 11a, 11b has a similar configuration to the engine 11. Each electric motor 14a, 14b has a similar configuration to the electric motor 14.

A first power generator 3a and a second power generator 3b are provided as the power generators 3. The first power generator 3a generates electric power when driven by the engine 11a of the first outboard motor 2a. The second power generator 3b generates electric power when driven by the engine 11b of the second outboard motor 2b.

The battery 4 stores electric power generated by the first power generator 3a and by the second power generator 3b, and supplies the electric power stored therein to the electric motor 14a of the first outboard motor 2a and the electric motor 14b of the second outboard motor 2b.

The marine operating device 5 includes a throttle lever 32a and a throttle lever 32b. The throttle lever 32a regulates a thrust generated by the first outboard motor 2a and switches the direction of the thrust between forward and rearward directions. The throttle lever 32b regulates a thrust generated by the second outboard motor 2b and switches the direction of the thrust between forward and rearward directions.

The controller 6 controls the first and second outboard motors 2a and 2b such that the first and second outboard motors 2a and 2b are able to be switched among a plurality of drive modes.

The plurality of drive modes include at least a fourth drive mode shown by (4) in FIG. 4 in addition to the first and second drive modes described above. In the fourth drive mode, the first and second outboard motors 2a and 2b are alternately driven in the state of the second drive mode.

In the fourth drive mode, the controller 6 alternately drives the first and second outboard motors 2a and 2b in the state of the second drive mode, for instance, at intervals of a predetermined time. The fourth drive mode is used to propel the watercraft 1 in the extremely low speed range.

In the fourth drive mode, when one of the first and second outboard motors 2a and 2b is driven in the second drive mode, the controller 6 preferably controls the engine of the other of the first and second outboard motors 2a and 2b to be in the idling state.

Specifically, in the fourth drive mode, when the first outboard motor 2a is driven in the second drive mode, the controller 6 preferably controls the engine 11b of the second outboard motor 2b to be in the idling state and simultaneously controls the electric motor 14b of the second outboard motor 2b to be in the stopped state. At this time, the dog clutch 13d of the second outboard motor 2b is controlled to be in the neutral position by the controller 6.

Now, the second outboard motor 2b set as "N" by (4) in FIG. 4 will be exemplified to explain the meaning of "N". In the second outboard motor 2b, the engine 11b is controlled to be in the idling state by the controller 6, the electric motor 14b is controlled to be in the stopped state, and the dog clutch 13d of the second outboard motor 2b is controlled to be in the neutral position. Such a state will be hereinafter explained as an N state. Specifically, in the fourth drive mode, when the first outboard motor 2a is driven in the second drive mode, the controller 6 controls the second outboard motor 2b in the N state. Likewise, in the fourth drive mode, when the second outboard motor 2b is driven in the second drive mode, the controller 6 controls the first outboard motor 2a to be in the N state. In this case, electric power is generated by both the first and second power generators 3a and 3b. Thus, a shortage of electric power supply to the electric motors 14a and 14b is reduced or prevented.

It should be noted that, in the fourth drive mode, when the first outboard motor 2a is driven in the second drive mode, the controller 6 may stop the engine 11b of the second outboard motor 2b. Likewise, in the fourth drive mode, when the second outboard motor 2b is driven in the second drive mode, the controller 6 may stop the engine 11a of the first outboard motor 2a.

As shown by (5) in FIG. 4, the plurality of drive modes may further include a fifth drive mode in which the first and second outboard motors 2a and 2b are alternately driven in the first drive mode. In the fifth drive mode, when one the first and second outboard motors 2a and 2b is driven in the first drive mode, the controller 6 controls the other of the first and second outboard motors 2a and 2b to be in the second drive mode.

The plurality of drive modes may further include a drive mode in which both the first and second outboard motors 2a and 2b are driven in the second drive mode. Alternatively or furthermore, the plurality of drive modes may include the third drive mode in which the engine 11a, 11b is controlled to be in the stopped state by the controller 6 in a similar manner to the first preferred embodiment. Yet alternatively or furthermore, the plurality of drive modes may include a drive mode in which the mechanical power is transmitted from both the engine 11a, 11b and the electric motor 14a, 14b to the propeller shaft 10.

Figure 6:
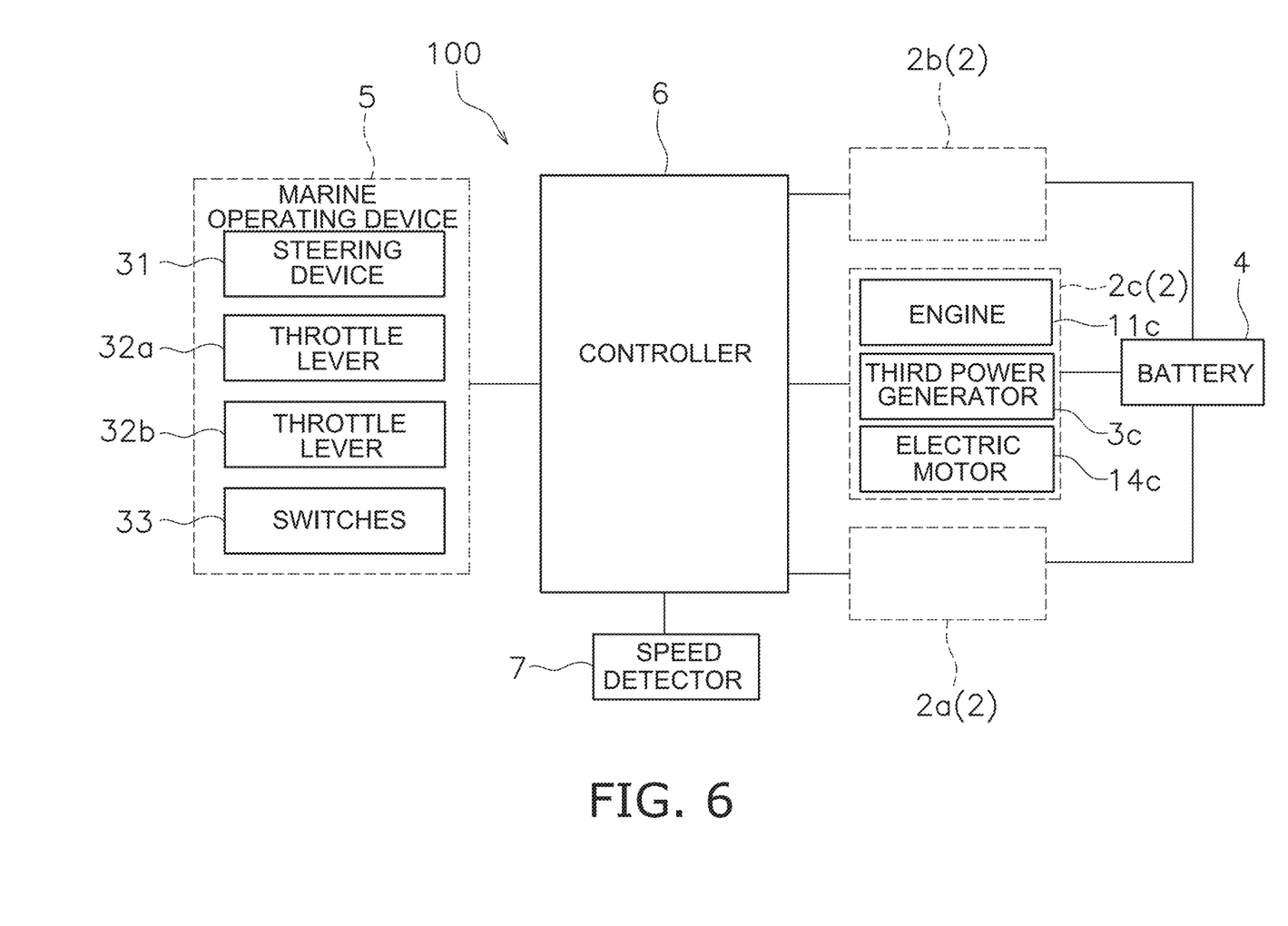
FIG. 6 is a block diagram showing a configuration of the marine propulsion system according to a third preferred embodiment of the present invention.

FIG. 6 is a block diagram showing a configuration of the marine propulsion system 100 according to a third preferred embodiment of the present invention. The following explanation will be provided for elements different from corresponding ones in the second preferred embodiment; explanation will be omitted for elements similar to corresponding ones in the second preferred embodiment. It should be noted that reference signs assigned to elements in FIG. 6 are the same as those assigned to corresponding ones in the second preferred embodiment.

In the third preferred embodiment, three outboard motors, including a third outboard motor 2c in addition to the two outboard motors described above, are provided as the outboard motors 2. The third outboard motor 2c is an exemplary third marine propulsion device. The third outboard motor 2c is attached to the middle of the stern of the watercraft 1. The third outboard motor 2c is located between the first and second outboard motors 2a and 2b. The third outboard motor 2c has a similar configuration to the outboard motor 2. The third outboard motor 2c includes an engine 11c and an electric motor 14c. The engine 11c has a similar configuration to the engine 11. The electric motor 14c has a similar configuration to the electric motor 14.

A third power generator 3c is further provided as an additional power generator 3. The third power generator 3c generates electric power when driven by the engine 11c of the third outboard motor 2c.

The battery 4 stores electric power generated by the third power generator 3c in addition to electric power generated by the first power generator 3a and that generated by the second power generator 3b, and supplies the electric power stored therein to the electric motor 14c of the third outboard motor 2c.

The controller 6 regulates a thrust generated by the third outboard motor 2c and switches the direction of the thrust in accordance with operating the throttle lever 32a, 32b. The controller 6 controls the third outboard motor 2c such that the third outboard motor 2c is switched among a plurality of drive moves.

The plurality of drive modes further include sixth to ninth drive modes shown by (6) to (9) in FIG. 4 in addition to the first and second drive modes described above. In the sixth drive mode, the first and second outboard motors 2a and 2b are driven in the first drive mode, whereas the third outboard motor 2c is driven in the second drive mode.

In the seventh drive mode, the first and second outboard motors 2a and 2b are driven in the fourth drive mode, whereas the third outboard motor 2c is driven in the first drive mode. In the seventh drive mode, electric power is generated by the third power generator 3c and at least one of the first and second power generators 3a and 3b. Thus, a shortage of electric power supply to the electric motor 14a, 14b is reduced or prevented.

In the eighth drive mode, at least one of the engine 11a of the first outboard motor 2a and the engine 11b of the second outboard motor 2b is controlled to be in the idling state, whereas only the third outboard motor 2c is driven in the first drive mode. It should be noted that in the configuration shown in FIG. 4, in the eighth drive mode, both the engine 11a of the first outboard motor 2a and the engine 11b of the second outboard motor 2b are controlled to be in the idling state by the controller 6. In other words, in the eighth drive mode, both the first and second outboard motors 2a and 2b are controlled to be in the N state.

In the ninth drive mode, at least one of the engine 11a of the first outboard motor 2a and the engine 11b of the second outboard motor 2b is controlled to be in the idling state, whereas only the third outboard motor 2c is driven in the second drive mode. It should be noted that in the configuration shown in FIG. 4, in the ninth drive mode, both the engine 11a of the first outboard motor 2a and the engine 11b of the second outboard motor 2b are controlled to be in the idling state by the controller 6. In other words, in the ninth drive mode, both the first and second outboard motors 2a and 2b are controlled to be in the N state.

Similarly to the second preferred embodiment, the plurality of drive modes may further include a drive mode in which the first, second, and third outboard motors 2a, 2b, and 2c are all controlled in the second drive mode. Alternatively or furthermore, the plurality of drive modes may include the third drive mode in which each engine 11a, 11b, 11c is controlled to be in the stopped state by the controller 6. Yet alternatively or furthermore, the plurality of drive modes may include a drive mode in which the mechanical power is transmitted from both the engine 11a, 11b, 11c and the electric motor 14a, 14b, 14c to the relevant propeller shaft 10.

Next, with reference to FIG. 4, explanation will be provided for a plurality of drive modes used when four outboard motors, including a fourth outboard motor 2d in addition to the three outboard motors described above, are provided as the outboard motors 2.

As shown in FIG. 4, the outboard motors 2a to 2d are sequentially located on the stern of the watercraft 1 from the port to the starboard in the order of the third outboard motor 2c, the first outboard motor 2a, the second outboard motor 2b, and the fourth outboard motor 2d.

In a drive mode shown by (10) in FIG. 4, the first and second outboard motors 2a and 2b are controlled in the fifth drive mode, whereas the third and fourth outboard motors 2c and 2d are controlled in the first drive mode.

In a drive mode shown by (11) in FIG. 4, the first and second outboard motors 2a and 2b are controlled in the fourth drive mode, whereas the third and fourth outboard motors 2c and 2d are controlled in the first drive mode.

In a drive mode shown by (12) in FIG. 4, the first and second outboard motors 2a and 2b are controlled in the first drive mode, whereas at least one of the third and fourth outboard motors 2c and 2d is controlled to be in the N state. It should be noted that in the configuration shown in FIG. 4, in the drive mode (12), both the third and fourth outboard motors 2c and 2d are controlled to be in the N state. Besides, the plurality of drive modes further include a drive mode (omitted in illustration), in which the first and second outboard motors 2a and 2b are controlled in the fourth or fifth drive mode, whereas at least one of the third and fourth outboard motors 2c and 2d is controlled to be in the N state.

Furthermore, the plurality of drive modes may include drive modes similar to those in the first to third preferred embodiments.

Next, with reference to FIG. 4, explanation will be provided for the plurality of drive modes used when five outboard motors, including a fifth outboard motor 2e in addition to the four outboard motors described above, are provided as the outboard motors 2.

As shown in FIG. 4, the outboard motors 2a to 2e are sequentially located on the stern of the watercraft 1 from the port to the starboard in the order of the fourth outboard motor 2d, the first outboard motor 2a, the third outboard motor 2c, the second outboard motor 2b, and the fifth outboard motor 2e.

In a drive mode shown by (13) in FIG. 4, the first, second, and third outboard motors 2a, 2b, and 2c are controlled in the sixth drive mode, whereas the fourth and fifth outboard motors 2d and 2e are controlled in the first drive mode.

In a drive mode shown by (14) in FIG. 4, the first, second, and third outboard motors 2a, 2b, and 2c are controlled in the seventh drive mode, whereas the fourth and fifth outboard motors 2d and 2e are controlled in the first drive mode.

In a drive mode shown by (15) in FIG. 4, the first, second, and third outboard motors 2a, 2b, and 2c are controlled in the first drive mode, whereas at least one of the fourth and fifth outboard motors 2d and 2e is controlled to be in the N state. It should be noted that in the configuration shown in FIG. 4, in the drive mode (15), both the fourth and fifth outboard motors 2d and 2e are controlled to be in the N state. Besides, the plurality of drive modes further include a drive mode (omitted in illustration), in which the first, second, and third outboard motors 2a, 2b, and 2c are controlled in any of the sixth to ninth drive modes, whereas at least one of the fourth and fifth outboard motors 2d and 2e is controlled to be in the N state. Furthermore, the plurality of drive modes may include drive modes similar to those in the first to third preferred embodiments.

Preferred embodiments of the present invention have been explained above. However, the present invention is not limited to the preferred embodiments described above, and a variety of changes can be made without departing from the gist of the present invention. For example, the configuration of the outboard motor 2 and/or that of the marine operating device 5 may be changed without being limited to those in the preferred embodiments described above.

Figure 7:
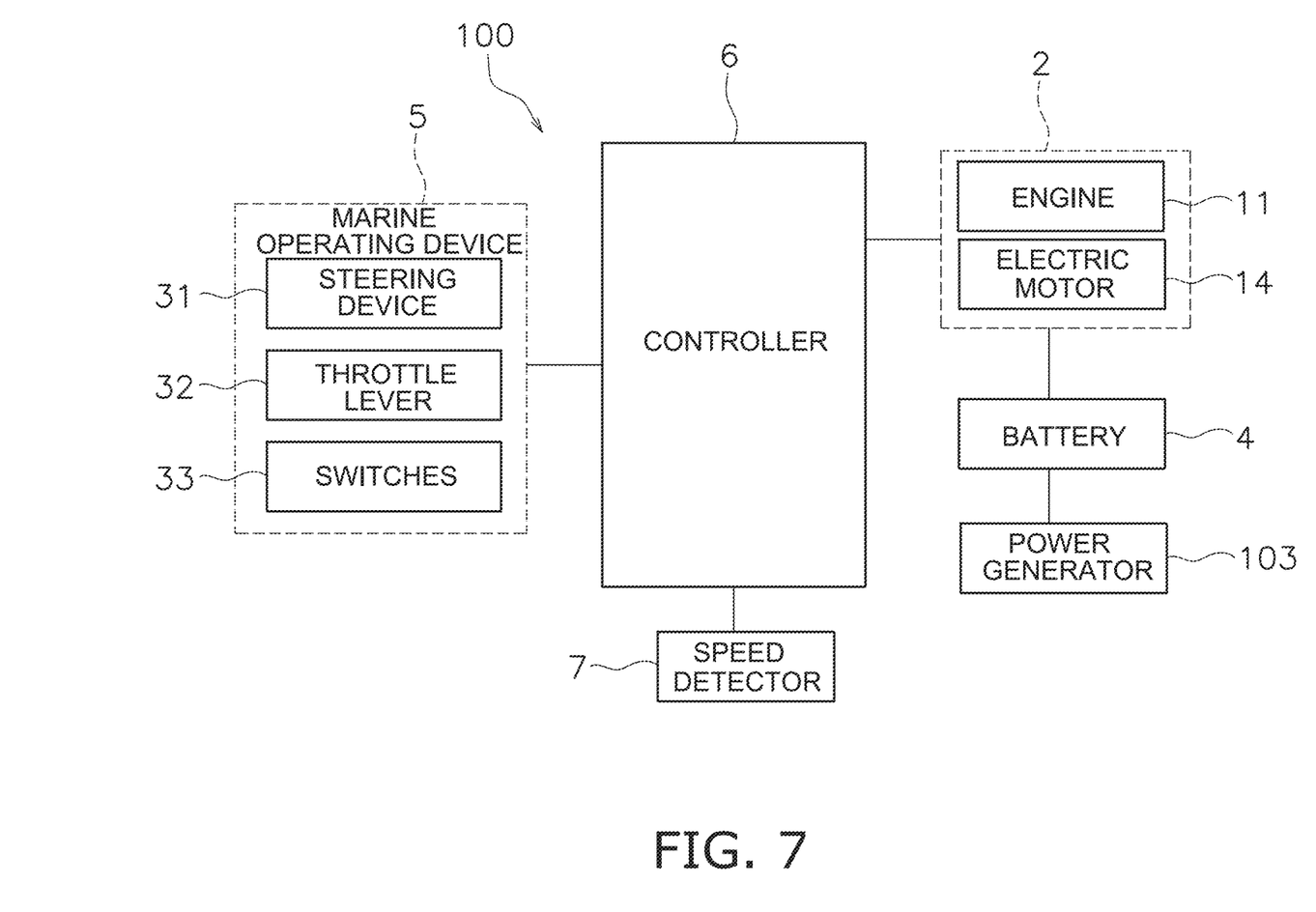
FIG. 7 is a block diagram showing a configuration of the marine propulsion system according to a modified preferred embodiment of the present invention.

FIG. 7 is a block diagram showing a configuration of the marine propulsion system 100 according to a modified preferred embodiment of the present invention. The modified preferred embodiment is different from the first preferred embodiment regarding the configuration of the power generator. However, the modified preferred embodiment is similar to the first preferred embodiment regarding the configurations of the other elements. In the modified preferred embodiment, a power generator 103 is located outside the outboard motor 2. The power generator 103, when described in detail, is embedded in the watercraft 1, or alternatively, is externally attached to the watercraft 1. The power generator 103 is capable of generating electric power regardless of driving of the engine 11 and supplies the electric power generated therein to the battery 4. The power generator 103 may be connected to the controller 6. Additionally, the marine propulsion system 100 according to the modified preferred embodiment may further include the power generator 3 that generates electric power when driven by the engine 11.

In the preferred embodiments described above, the outboard motor 2 has been exemplified as an exemplary marine propulsion device. However, the present invention may be applied to an inboard/outboard motor.

The marine propulsion system 100 is not necessarily required to include the speed detector 7. The marine propulsion system 100 may include a plurality of batteries 4. For example, in the second preferred embodiment, the battery 4 may include a first battery to store the electric power generated by the first power generator 3a and a second battery to store the electric power generated by the second power generator 3b. Likewise, in the third preferred embodiment, the battery 4 may further include a third battery to store the electric power generated by the third power generator 3c.

The plurality of drive modes switchable by the controller 6 are not required to include all the plurality of drive modes explained in the preferred embodiments described above; any of the plurality of drive modes may be omitted.

In the third preferred embodiment, what is preferably is that at least the third outboard motor 2c includes the electric motor 14c. In other words, the electric motor 14a of the first outboard motor 2a and the electric motor 14b of the second outboard motor 2b may be omitted. In the third preferred embodiment, each of the first and second outboard motors 2a and 2b may be configured to transmit the mechanical power from only the engine 11a, 11b to the propeller shaft 10. This configuration results in the omission of the seventh and eight drive modes.

When four outboard motors, including the first to fourth outboard motors 2a to 2d, are provided as the outboard motors 2, each of the third and fourth outboard motors 2c and 2d is not necessarily required to include the electric motor. What is preferable is that at least the first and second outboard motors 2a and 2b include the electric motors 14a and 14b, respectively. Likewise, when five outboard motors, including the first to fifth outboard motors 2a to 2e, are provided as the outboard motors 2, each of the fourth and fifth outboard motors 2d and 2e is not necessarily required to include the electric motor. What is preferable is that at least the third outboard motor 2c includes the electric motor 14c.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion system comprising:
    a marine propulsion device including a propeller shaft, an engine, and an electric motor to transmit a mechanical power from at least one of the engine and the electric motor to the propeller shaft;
    a battery to supply an electric power to the electric motor;
    a controller configured or programmed to control the marine propulsion device such that the marine propulsion device is switchable among a plurality of drive modes including a first drive mode in which the mechanical power is transmitted from only the engine to the propeller shaft, and a second drive mode in which the mechanical power is transmitted from only the electric motor to the propeller shaft when the engine is in an idling state; and
    a power generator to generate the electric power to be supplied to the battery; wherein
    in the second drive mode, the electric power is generated by the power generator.

2. The marine propulsion system according to claim 1, wherein the plurality of drive modes further include a third drive mode in which the mechanical power is transmitted from only the electric motor to the propeller shaft when the engine is in a stopped state.

3. The marine propulsion system according to claim 1, further comprising:
a speed detector to detect a vessel speed; wherein
the controller is configured or programmed to switch the marine propulsion device from the first drive mode to the second drive mode when the vessel speed detected by the speed detector becomes lower than or equal to a predetermined speed when the marine propulsion device is in the first drive mode.

4. The marine propulsion system according to claim 1, further comprising:
a speed regulator to regulate a vessel speed; wherein
the controller is configured or programmed to drive the marine propulsion device in the second drive mode when the vessel speed is set to be lower than or equal to a predetermined speed by the speed regulator.

5. The marine propulsion system according to claim 1, wherein
the marine propulsion device is one of a plurality of marine propulsion devices including at least a first marine propulsion device and a second marine propulsion device aligned with the first marine propulsion device;
the power generator is one of a plurality of power generators including a first power generator and a second power generator, the first power generator to generate an electric power when driven by the engine of the first marine propulsion device, and the second power generator to generate an electric power when driven by the engine of the second marine propulsion device;
the battery stores the electric power generated by each of the first and second power generators and supplies the electric power stored therein to each of the electric motors of the first and second marine propulsion devices; and
the plurality of drive modes further include a fourth drive mode in which the first and second marine propulsion devices are alternately driven in the second drive mode.

6. The marine propulsion system according to claim 5, wherein in the fourth drive mode, when one of the first and second marine propulsion devices is being driven in the second drive mode, the controller is configured or programmed to control the engine of the other of the first and second marine propulsion devices in the idling state.

7. The marine propulsion system according to claim 5, wherein the plurality of drive modes further include a third drive mode in which the mechanical power is transmitted from only the electric motor to the propeller shaft when the engine is in a stopped state.

8. The marine propulsion system according to claim 5, wherein
the plurality of drive modes further include a fifth drive mode in which the first and second marine propulsion devices are alternately driven in the first drive mode; and
in the fifth drive mode, when one of the first and second marine propulsion devices is being driven in the first drive mode, the controller is configured or programmed to control the other of the first and second marine propulsion devices in the second drive mode.

9. The marine propulsion system according to claim 5, wherein the plurality of marine propulsion devices further include a third marine propulsion device located between the first and second marine propulsion devices;
the plurality of power generators further include a third power generator to generate an electric power when driven by the engine of the third marine propulsion device; and
the battery stores the electric power generated by the third power generator and supplies the electric power stored therein to the electric motor of the third marine propulsion device.

10. The marine propulsion system according to claim 9, wherein the plurality of drive modes further include a sixth drive mode in which the first and second marine propulsion devices are driven in the first drive mode while the third marine propulsion device is driven in the second drive mode.

11. The marine propulsion system according to claim 9, wherein the plurality of drive modes further include a seventh drive mode in which the first and second marine propulsion devices are driven in the fourth drive mode while the third marine propulsion device is driven in the first drive mode.

12. The marine propulsion system according to claim 9, wherein the plurality of drive modes further include an eighth drive mode in which at least one of the engines of the first and second marine propulsion devices is in the idling state while only the third marine propulsion device is driven in the first drive mode.

13. The marine propulsion system according to claim 9, wherein the plurality of drive modes further include a ninth drive mode in which at least one of the engines of the first and second marine propulsion devices is in the idling state while only the third marine propulsion device is driven in the second drive mode.

14. The marine propulsion system according to claim 1, further comprising:
a second marine propulsion device including a second propeller shaft and a second engine to transmit a mechanical power from the second engine to the second propeller shaft; and
a third marine propulsion device including a third propeller shaft and a third engine to transmit a mechanical power from the third engine to the third propeller shaft; wherein
the power generator is one of a plurality of power generators including:
a first power generator to generate an electric power when driven by the engine;
a second power generator to generate an electric power when driven by the second engine; and
a third power generator to generate an electric power when driven by the third engine;
the marine propulsion device is located between the second and third marine propulsion devices;
the battery stores the electric power generated by each of the first, second, and third power generators; and
the controller is configured or programmed to control the second and third engines in the idling state when the marine propulsion device is driven in the second drive mode.

15. A method of controlling a marine propulsion system including a marine propulsion device and a battery, the marine propulsion device including a propeller shaft, an engine, and an electric motor to transmit a mechanical power from at least one of the engine and the electric motor to the propeller shaft, and the battery to supply an electric power to the electric motor, the method comprising:

controlling the marine propulsion device such that the marine propulsion device is switchable among a plurality of drive modes including a first drive mode in which the mechanical power is transmitted from only the engine to the propeller shaft, and a second drive mode in which the mechanical power is transmitted from only the electric motor to the propeller shaft when the engine is in an idling state; wherein the marine propulsion system further includes a power generator to generate the electric power to be supplied to the battery; and in the second drive mode, the electric power is generated by the power generator.

16. The method according to claim 15, wherein the marine propulsion device is one of a plurality of marine propulsion devices including at least a first marine propulsion device and a second marine propulsion device aligned with the first marine propulsion device;

the power generator is one of a plurality of power generators including a first power generator and a second power generator, the first power generator to generate an electric power when driven by the engine of the first marine propulsion device, and the second power generator to generate an electric power when driven by the engine of the second marine propulsion device;

the battery stores the electric power generated by each of the first and second power generators and supplies the electric power stored therein to each of the electric motors of the first and second marine propulsion devices; and the plurality of drive modes further include a fourth drive mode in which the first and second marine propulsion devices are alternately driven in the second drive mode.

17. The method according to claim 16, further comprising:

in the fourth drive mode, when one of the first and second marine propulsion devices is being driven in the second drive mode, controlling the engine of the other of the first and second marine propulsion devices in the idling state.

18. The method according to claim 16, wherein the plurality of marine propulsion devices further include a third marine propulsion device located between the first and second marine propulsion devices;

the plurality of power generators further include a third power generator to generate an electric power when driven by the engine of the third marine propulsion device; and the battery stores the electric power generated by the third power generator and supplies the electric power stored therein to the electric motor of the third marine propulsion device.

* * * * *